US00RE35709E

United States Patent [19]

Culler

[11] E Patent Number: Re. 35,709

[45] Reissued Date of Patent: Jan. 6, 1998

[54] REDUCED VISCOSITY SLURRIES, ABRASIVE ARTICLES MADE THEREFROM AND METHODS OF MAKING SAID ARTICLES

[75] Inventor: Scott R. Culler, Burnsville, Minn.

[73] Assignee: Minnesota Mining and Manufacturing Corporation, St. Paul, Minn.

[21] Appl. No.: 716,655

[22] Filed: Sep. 6, 1996

Related U.S. Patent Documents

Reissue of:

[64] Patent No.: 5,368,619
Issued: Nov. 29, 1994
Appl. No.: 177,595
Filed: Jan. 5, 1994

U.S. Applications:

[63] Continuation of Ser. No. 992,137, Dec. 17, 1992, abandoned.

[51] Int. Cl.[6] ..... B24D 3/24

[52] U.S. Cl. ..... 51/308; 51/295

[58] Field of Search ..... 51/295, 298, 307, 51/308

[56] References Cited

U.S. PATENT DOCUMENTS

| | | | |
|---|---|---|---|
| 2,322,156 | 12/1943 | Oglesby | 51/298 |
| 2,534,805 | 12/1950 | Waterfield | 51/297 |
| 2,676,892 | 4/1954 | McLaughlin | 106/681 |
| 2,806,772 | 9/1957 | Robie | 51/296 |
| 2,958,593 | 11/1960 | Hoover et al. | 51/295 |
| 3,631,638 | 1/1972 | Yoshikawa et al. | 51/295 |
| 3,689,346 | 9/1972 | Rowland | 156/245 |
| 4,202,952 | 5/1980 | Onizawa | 19/22 |
| 4,318,766 | 3/1982 | Smith | 156/330 |
| 4,576,850 | 3/1986 | Martens | 428/156 |
| 4,588,419 | 5/1986 | Caul et al. | 51/295 |
| 4,642,126 | 2/1987 | Zador et al. | 51/295 |
| 4,644,703 | 2/1987 | Kaczmarek et al. | 451/533 |
| 4,652,275 | 3/1987 | Bloecher et al. | 51/298 |
| 4,735,632 | 4/1988 | Oxman | 51/295 |
| 4,751,138 | 6/1988 | Tumey et al. | 51/295 |
| 4,773,920 | 9/1988 | Chasman et al. | 51/295 |
| 4,871,370 | 10/1989 | DeWald | 51/298 |
| 4,871,376 | 10/1989 | DeWald | 51/298 |
| 4,903,440 | 2/1990 | Larson et al. | 51/298 |
| 4,927,431 | 5/1990 | Buchanan et al. | 51/308 |
| 4,933,373 | 6/1990 | Moren | 52/99 |
| 4,985,340 | 1/1991 | Palazzotto et al. | 164/468 |
| 5,000,761 | 3/1991 | Mayton et al. | 51/308 |
| 5,011,513 | 4/1991 | Zador et al. | 51/295 |
| 5,014,468 | 5/1991 | Ravipati et al. | 51/308 |
| 5,015,266 | 5/1991 | Yamamoto | 51/295 |
| 5,152,917 | 10/1992 | Pieper et al. | 51/295 |
| 5,256,170 | 10/1993 | Harmer et al. | 51/295 |

FOREIGN PATENT DOCUMENTS

| | | |
|---|---|---|
| 0 109 581 | 5/1984 | European Pat. Off. . |
| 0 306 161 | 3/1989 | European Pat. Off. . |
| 0 306 162 | 3/1989 | European Pat. Off. . |
| 0 366 051 | 5/1990 | European Pat. Off. . |
| 0 396 150 | 11/1990 | European Pat. Off. . |
| 1 961 763 | 12/1970 | Germany . |
| WO 92/13680 | 8/1992 | WIPO . |

OTHER PUBLICATIONS

*Encyclopedia of Polymer Science and Technology*, vol. 8, John Wiley & Sons, Inc. (1968) pp. 651–665.

"Clay Colloid Chemistry", pp. 64–71 (1977).

*Clays and Clay Materials*, "Report of the Clay Minerals Society Nomenclature Committee: Revised Classification of Clay Materials," vol. 39, No. 3, pp. 333–335 (1991).

*Primary Examiner*—Deborah Jones

*Attorney, Agent, or Firm*—Gary L. Griswold; Walter N. Kirn; Doreen S. L. Gwin

[57] ABSTRACT

Sluuries and binder precursor dispersions suitable for use in producing abrasive articles are presented. Slurries comprise a polymerizable resin which is preferably addition polymerizable, abrasive particles, and modifying particles, wherein the modifying particles are present in an amount sufficient to reduce the viscosity of the slurry. Abrasive articles incorporating cured versions of the slurries and dispersions are presented, as well as methods of making the articles and of reducing sedimentation rate of mineral particles (abrasive or filler).

8 Claims, No Drawings

REDUCED VISCOSITY SLURRIES, ABRASIVE ARTICLES MADE THEREFROM AND METHODS OF MAKING SAID ARTICLES

Matter enclosed in heavy brackets [ ] appears in the original patent but forms no part of this reissue specification; matter printed in italics indicates the additions made by reissue.

This is a continuation of application No. 07/992,137 filed Dec. 17, 1992 now abandoned.

BACKGROUND OF THE INVENTION

1. Field of the Invention

This invention relates to slurries and dispersions useful in making abrasive articles. More specifically, this invention relates to abrasive articles made from slurries and dispersions having viscosity modifying particles therein.

2. Description of Related Art

Three common abrasive articles are coated abrasives, bonded abrasives, and nonwoven abrasives. A coated abrasive comprises a backing onto which abrasive particles are adhered with a binder. The backing may, for example, be selected from paper, cloth, film, vulcanized fiber, and the like, or a combination of one or more of these materials or treated versions thereof. The abrasive particles are typically chosen from flint, garnet, aluminum oxide, alumina zirconia, ceramic aluminum oxide, diamond, silicon carbide, cubic boron nitride, and the like. In bonded abrasives, a slurry is prepared comprising a resin and abrasive particles. When the slurry is placed in a mold, the resin is cured, typically using heat and pressure, holding the abrasive particles together to form a three-dimensional object. Examples of bonded abrasives include grinding wheels, honing sticks, dresser sticks and sharpening sticks. Nonwoven abrasives comprise an open, lofty, three dimensional web of fibers bound together at points where they contact by a binder, which may or may not include abrasive particles. In what may be viewed as a combination of bonded and coated abrasives, slurries as described may be coated onto backings and the resin cured via heat and/or addition polymerization.

In producing the above-mentioned abrasive articles by addition polymerization, polymerization may be initiated in a variety of ways, for example, by thermal decomposition of peroxides or radiation (particle or non-particle), or a combination of the two, depending on the chemistry of the resin. Initiators of the photo and thermal types are common. In the case of initiation by particle radiation, polymerization is typically initiated by irradiation of the binder with an electron beam. The chain carrier in the propagation step may be either ionic or contain a free radical.

Binders used to produce abrasive articles may, and preferably do, contain fillers. Fillers are typically organic or inorganic particulates dispersed within the resin and may modify either the binder precursor or the cured binder's properties, or both, or may simply be used to reduce cost. For example, fillers may operate to inexpensively increase the volume of the binder precursor, thus decreasing cost. Also, fillers often make the cured resin harder or more resistant to changes in humidity (see for example U.S. Pat. No. 2,534,805), more heat resistant, and/or less likely to shrink when cured. The latter is important since shrinkage during cure causes considerable stress, which can lead to premature breakdown of the abrasive product. In some instances fillers may also be used as pigments. Fillers typically have small average particle size, are relatively soft by comparison to abrasive particles, and do not themselves significantly abrade the workpiece. Fillers generally comprise materials which are substantially inert or non-reactive with respect to the workpiece acted upon by the abrasive product. However, "reactive" fillers may be desired for a particular application. A reactive filler interacts with the workpiece in some manner.

While use of fillers may be beneficial in reducing cost and for modification of abrasion properties, originally coatable mixtures of resin, abrasive particles and filler may be difficult to render coatable after having set idle because the filler and/or abrasive particles may settle to the bottom of the container. To avoid disposing of the mixture, the mixture must be agitated to redisperse the abrasive and/or filler particles, which is time consuming and not always successful. Thus, in U.S. Pat. No. 5,014,468, col., 18, lines 48–56, it is disclosed that the slurries used therein are constantly agitated. For these reasons, while the use of fillers may reduce cost, formulators generally have not had the luxury of producing a batch of coatable mixture which would remain coatable for extended periods (i.e., days).

U.S. Pat. No. 4,871,376 (DeWald) describes reducing viscosity of resin/filler dispersions by utilizing a silane coupling agent, but the reference teaches that use of fillers having particle size less than about 2 micrometers is to be avoided due to the increase in viscosity. This evidences the general assumption by artisans of ordinary skill that the addition of small particle size fillers increases the viscosity of slurries and dispersions. Solvents can be added to the mixtures to reduce viscosity; however, most of the added solvents are organic compounds which may make handling and processing of binder precursor mixtures problematic or more expensive. See for example U.S. Pat. No. 5,011,513, where N-methyl pyrrolidone is used to control rheological properties of make and size coating precursor dispersions which include fillers having average particle size of 15 micrometers.

There is thus a need in the abrasives art for binder precursors having reduced viscosity at the time they are to be applied to a backing, and which remain in a coatable form (i.e., with the abrasive and/or filler particles still dispersed therein) for long periods of storage time before they are coated onto backings.

Caul et al., in U.S. Pat. No. 4,588,419, disclose coated abrasives made from a combination of electron curable and heat curable resins. The resins may include calcium carbonate filler and a suspending agent, the preferred suspending agent apparently being fumed silica such as that known under the trade designation "Aerosil 200" (average particle size 12 millimicrometers, surface area 200 $m^2/g$). Fumed silica suspending agent is utilized in face fill, back fill, make and size coatings in the Examples of this reference. There is no disclosure of a reduction in viscosity using the disclosed suspending agent, nor an increase in the time that the suspension remains coatable.

SUMMARY OF THE INVENTION

In accordance with the present invention, slurries and dispersions are presented having reduced viscosity and which remain as slurries or dispersions for days, rather than hours. As used herein the term "slurry" means abrasive particles dispersed in a polymerizable resin, preferably an addition polymerizable resin, the resin also having modifying particles dispersed therein, and optionally a diluent. "Addition polymerizable resins" includes resins in which polymerization is initiated and propagated by either free radicals or ions, and the terms "polymerizable" and "polymerized" resin are meant to include both chain growth and crosslinking reactions.

The term "dispersion" means conventional filler particles are dispersed in a polymerizable resin, preferably an addition polymerizable resin, the resin also having modifying particles dispersed therein, and optional diluent.

As used herein the term "modifying particles" excludes coupling agents, and includes particulate materials which do not dissolve in or react with the polymerizable resins described herein.

"Binder" means a cured binder, whereas "binder precursor" means an uncured mixture. As used herein, the terms "dispersed" and "distributed" do not necessarily connote a uniform or homogeneous mixture, although uniformly dispersed slurries and dispersions are preferred.

The slurries and binder precursor dispersions of the invention may be stored for long periods of time (3 days or longer) before they are coated onto backings, and when coated, have viscosity lower than slurries and dispersions devoid of the modifying particles.

Thus, one aspect of the invention is a slurry suitable for use in producing abrasive articles, the slurry consisting essentially of a polymerizable resin, abrasive particles, and modifying particles, and preferably a reactive diluent. The modifying particles are present in an amount sufficient to reduce the viscosity of the same slurry, preferably by at least about 10 percent, more preferably at least about 30 percent. (Viscosity tests are described in the Test Methods and Examples sections.)

The term "consisting essentially of" means the slurries and dispersions of the invention exclude only those materials which would cause the slurries and dispersions of the invention to increase in viscosity or gel when at the same temperature. In the specific context of this invention, this means that the inventive binder precursors preferably contain less than 5 weight percent water, more preferably less than 1 weight percent, and most preferably no water, since water leads to hydrogen bonding. The binder precursors of the invention also preferably have less than 5 weight percent, more preferably less than 1 weight percent, and most preferably no other materials which may contribute hydrogen bonding, van der Waals attractions, or "pi" bond overlaps. Thus, as is shown in the Examples, the modifying particles do not reduce the viscosity of aqueous solutions of resins such as resole phenolics, since the degree of hydrogen bonding actually increases, with a corresponding increase in viscosity.

The term "the same" slurry or dispersion means the modifying particles are added to an identical slurry or dispersion devoid of said modifying particles, except that modifying particles are substituted for some of the abrasive particles to maintain a constant volume loading.

In the context of the present invention the phrase "suitable for use in producing abrasive articles" means that, in the case of coated, bonded, and nonwoven abrasives, the slurries and dispersions of the invention have viscosity allowing them to be coated, sprayed, or poured onto a backing or into a mold without having to pre-agitate or continuously agitate the slurry or dispersion.

Preferred slurries in accordance with this aspect of the invention are those including a reactive diluent and a photoinitiator, and those wherein an addition polymerizable resin is employed. One preferred type of addition polymerizable resin is an acrylated isocyanurate monomer and/or oligomer. As used herein the term "resin" includes monomers and oligomers, where "oligomer" has its generally accepted meaning as a material comprised of 2 to 5 identical monomer units. Another generally accepted definition is that an oligomer is a polymer whose properties change with the addition or removal of one or a few repeating units. The properties of a true polymer do not change markedly with such modification.

The slurries of the invention may also contain conventional filler particles, for example calcium carbonate, but if so, the filler particles should be compatible with the resin, have a specific gravity ranging from about 1.5 to about 4.5, and range in particle size from about 1 micrometer to about 100 micrometers, preferably from about 5 to about 50 micrometers, more preferably from about 10 to about 25 micrometers. The filler particles preferably have average particle size which is smaller then the average particle size of the abrasive particles.

Another aspect of the invention is a binder precursor dispersion suitable for use in producing abrasive articles, the dispersion consisting essentially of a polymerizable resin, preferably an addition polymerizable resin, filler particles, and modifying particles, and preferably a reactive diluent. As with the inventive slurries, the modifying particles are present in an amount sufficient to reduce the viscosity of the same binder precursor dispersion, preferably by at least about 10 percent, more suitably at least about 30 percent.

Yet another aspect of the invention is a coated abrasive of the type having a backing and an abrasive coating thereon. In this aspect of the invention, the abrasive coating comprises (dry weight basis) from about 20 to about 95 weight percent polymerized resin, from about 30 to about 70 weight percent abrasive particles, and from about 0.01 to about 30 weight percent modifying particles. Bonded and nonwoven abrasives are also aspects of the invention, the inventive bonded abrasives derived from the inventive slurries, and the binder of the inventive nonwoven abrasives derived either from the inventive slurries or the inventive dispersions.

Another aspect of the invention is a method of making a coated abrasive comprising the steps of:

(a) coating a backing material with a slurry consisting essentially of a polymerizable resin, abrasive particles, and modifying particles, wherein the modifying particles are present in an amount sufficient to reduce the viscosity of the same slurry; and (b) subjecting the coated backing of step (a) to conditions sufficient to cure the polymerizable resin.

Preferred are those methods wherein the polymerizable resin is an addition polymerizable resin, such as an acrylated isocyanurate oligomer or monomer, more preferably the triacrylate of tris(hydroxyethyl) isocyanurate dissolved in trimethylol propane.

Another method of making coated abrasives within the invention comprises the steps of:

a) coating a first surface of a backing having first and second surfaces with a slurry consisting essentially of a polymerizable resin, abrasive particles, and modifying particles, wherein the modifying particles are present in an amount sufficient to reduce the viscosity of the same slurry, preferably by at least about 10 percent;

b) contacting a third surface with the slurry coated first surface, at least one of the first and third surfaces having a predetermined pattern;

c) exposing the slurry to conditions sufficient to cure the polymerizable resin; and d) removing one of the first or third surfaces to form a coated abrasive.

One preferred method comprises coating a first surface of a backing having first and second surfaces with the inventive slurry, the slurry-coated first surface of the backing then contacted with a third surface which is patterned, the slurry exposed to conditions (preferably ultraviolet radiation) sufficient to cure the polymerizable resin, and the abrasive surface-containing backing removed from the patterned surface to yield a coated abrasive. Alternatively, one may first coat a patterned surface with a slurry, place a backing material over the slurry-coated patterned surface, expose the slurry to conditions (preferably ultraviolet radiation) sufficient to cure the polymerizable resin, and remove the abrasive surface-containing backing from the patterned surface to yield a coated abrasive.

As previously stated, another advantage of using the modifying particles is that they drastically reduce the separation of mineral particles (defined to include both abrasive particles and filler particles) from slurries and dispersions by gravity. In previously known slurries and dispersions, as soon as agitation is stopped the larger mineral particles begin to settle to the bottom of the mixing container and become compacted there. Typically, within a couple of hours most of the mineral is compacted on the bottom of the container and the resin has separated to the top. This compacted mineral must be redispersed (which may be very difficult to do) before the slurry or dispersion may be used. When the modifying particles are incorporated into the slurries and dispersions, the rate of sedimentation of the mineral particles is greatly reduced, yielding slurries and dispersion of the invention that have very little or no compaction of mineral particles on the bottom of the container for about 2 to 5 days, preferably at least 3 days. This eliminates the need for constant agitation to coat the slurries and dispersions of the invention. The amount of modifying particles needed to prevent sedimentation of the mineral particles is preferably as little as 0.5 dry weight percent, but typically ranges from about 0.5 to about 5 dry weight percent.

Thus, another aspect of the invention is a method of reducing the sedimentation rate of mineral particles in a first composition (either slurry or dispersion) consisting essentially of mineral particles and polymerizable resin, the method comprising adding to the first composition an effective amount of modifying particles to form a modified composition, the modifying particles present in the modified composition in an amount sufficient to reduce the sedimentation rate of the mineral particles so that the modified composition remains coatable for a period of time which is greater than the time the first composition remains coatable. Preferably this time is at least more than 25% greater than the time the first composition remains coatable, more preferably at least 100% greater, and most preferably indefinitely.

Other advantages and aspects of the invention will be described in the description of preferred embodiments which follows.

DESCRIPTION OF PREFERRED EMBODIMENTS

This invention pertains to slurries and dispersions, abrasive articles made employing same, and to methods of making abrasive articles, the articles having performance properties equal to or improved over previously known abrasive articles. A method of reducing the rate of sedimentation of mineral particles is also described. Through the inclusion of modifying particles such as amorphous silica, hydrophobic fumed silica, and precipitated silica, lower viscosity slurries and dispersions exhibiting improved suspension of mineral particles are obtained.

Coated and nonwoven abrasive articles may employ either the slurries or the dispersions of the invention, while bonded abrasives may employ the inventive slurries. In coated abrasives, the term "binder" may refer to any of the coatings. In nonwoven abrasives the binder bonds abrasive particles onto the fibers of a porous, lofty, fibrous web, and typically binds the fibers to themselves at points where they contact.

Modifying Particles

Modifying particles are added to conventional (i.e., previously known) binder precursors which have the effect of lowering the binder precursor viscosity and reduce the rate of sedimentation of abrasive and/or filler particles in the binder precursors. Modifying particles useful in the invention typically comprise an inorganic particulate material having a small particle size. Generally, the addition of inorganic particulate matter such as conventional fillers having small particle size to a binder precursor composition has been avoided in the art. For example, the inventors of U.S. Pat. No. 4,871,376 maintain that filler particles of less than 2 micrometers are to be avoided in coated abrasive binder precursors, since such small particles do not produce a readily coatable binder precursor that flows properly during the coating operation.

Surprisingly, it has been found that the addition of modifying particles, whose average particle size is preferably less than the average particle size of the abrasive or filler particles, act to reduce the viscosity of slurries and binder precursor dispersions, and retain abrasive and filler particles in suspension for long periods of time without agitation.

Preferably, the average particle size of the modifying particles is less than about 100 millimicrometers, more preferably less than about 50 millimicrometers. Individual modifying particles may range in particle size from about 1 millimicrometer to about 100 millimicrometers, more preferably ranging from about 10 millimicrometers to about 25 millimicrometers depending on the average particle size of the abrasive and/or filler particles in the binder precursor.

The surface area of useful modifying particles should be less than about 300 $m^2/g$, more preferably less than about 200 $m^2/g$, particularly preferably less than about 150 $m^2/g$, and most preferably less than about 100 $m^2/g$. The low surface area of modifying particles useful in the invention is critical. If the surface area is too high (above about 300 $m^2/g$) the modifying particles act as thixotropic agents, sometimes increasing the viscosity of slurries and binder precursor dispersions beyond the desired level. In effect, it is theorized that there then exists too much hydrogen bonding.

Preferred modifying particles include silica particles such as those available from the Degussa Corp., Ridgefield Park, N.J. under the tradenames "OX-50", "R-812" and "P-820" the first being an amorphous silica having average particle size of 40 millimicrometers, surface area of 50 $m^2/g$, the second being a hydrophobic fumed silica having average particle size of 7 millimicrometers and surface area of 260 $m^2/g$, and the third being a precipitated silica having average particle size of 15 millimicrometers and surface area of 100 $m^2/g$.

Amorphous silica particles, if used, are preferably at least 90% pure, more preferably at least 95% pure and most preferably at least 99% pure. The major impurities are primarily other metal oxides such as aluminum oxide, iron oxide and titanium dioxide. Amorphous silica particles tend to be spherical in shape and have a density between 2.1 to 2.5 g/m$^3$.

Modifying particles are preferably present in the slurries and binder precursor dispersions from about 0.01 dry weight percent to about 30 dry weight percent, more preferably from about 0.05 to about 10 weight percent, and most preferably from about 0.5 to about 5 weight percent.

Modifying particles are not soluble in the binder precursors of the invention, but are suspended in the slurry or dispersion. It is theorized that most fillers and abrasive particles have water or other source of hydroxyl groups attached to their surface. The presence of hydroxyl groups results in hydrogen bonding between the modifying particle and the filler or abrasive particle, and it is believed that this hydrogen bonding is responsible for keeping the larger particle size abrasive and filler particles suspended in the resin. If hydrogen bonding between modifying particle to mineral particle is absent, it is theorized that the mineral particles would settle out of the slurry or dispersion. If the resin of the slurry or dispersion is capable of significant hydrogen bonding, it is theorized that there then exists too much hydrogen bonding, leading to an increase in viscosity.

It is also theorized that the addition of small average particle size modifying particles alters the particle size distribution of abrasive particles in the slurries of the invention, and that of fillers in dispersions of the invention. Typically, the particle size distribution of the abrasive particles in slurries and fillers in dispersions is skewed or abnormal. The addition of modifying particles results in this distribution becoming more "normal" or Guassian, and it is theorized that this more Guassian distribution of particle sizes results in lowered viscosity slurries and binder precursor dispersions.

Polymerizable Resins

Polymerizable resins useful in the invention may be selected from those commonly used in the abrasive art to the extent that hydrogen bonding, van der Waals forces, and the like, do not destroy the viscosity reducing effects of the modifying particles. The resin should be selected such that it has the desired properties necessary for the intended use of the abrasive article. For example, in course grade applications, the cured resin should be hard, heat resistant and tough.

Addition polymerizable resins useful in the practice of the invention are those resins capable of being initiated by exposure to radiation, a photoinitiator, a thermal initiator, or combination of these. Non-particle radiation includes ultraviolet radiation, infrared radiation, and visible light, while the most commonly used particle radiation used is electron beam irradiation. A combination of particle and non-particle radiation curable resins may be used, but resins which may be initiated by UV or visible light are presently preferred.

Addition polymerizable resins polymerize via a free radical mechanism or an ionic mechanism. Free radicals or ions may be produced by addition of photoinitiators or thermal initiators to the resins. When a photoinitiator alone is used, or when it is exposed to non-particle radiation such as ultraviolet radiation or visible light, the photoinitiator generates a free radical or an ion. This free radical or ion initiates the polymerization of the resin.

Examples of typical and preferable addition polymerizable resins preferred for use in the binder precursors of the invention include: polymers, oligomers, and monomers which are ethylenically unsaturated, such as styrene, divinylbenzene, vinyl toluene, and aminoplast resins having pendant unsaturated carbonyl groups, and the like, (including those having at least 1.1 pendant alpha, beta unsaturated carbonyl group per molecule or oligomer as described in U.S. Pat. No. 4,903,440, which is hereby incorporated by reference); acrylated resins such as isocyanurate resins having at least one pendant acrylate group (such as the triacrylate of tris(hydroxyethyl) isocyanurate), acrylated urethane resins, acrylated epoxy resins, and isocyanate derivatives having at least one pendant acrylate group. It is to be understood that mixtures of the above resins could also be employed. The term "acrylated" is meant to include monoacrylated, monomethacrylated, multi-acrylated, and multi-methacrylated monomers, oligomers and polymers.

It is noteworthy to mention that monomers which are solids at room temperature may be used if dissolved in a suitable solvent. This is the case with the triacrylate of tris(hydroxyethyl) isocyanurate ("TATHEIC"), one particularly preferred resin, which is a solid at room temperature. When this monomer is used, the "polymerizable resin" for which viscosity reduction is attained includes the solvent, which may or may not be reactive with the monomer, but preferably is reactive with the monomer (and is therefore considered another monomer). One preferred solvent for room temperature solid acrylated monomers is trimethylol propane triacrylate ("TMPTA"); however, solvents such as these are more correctly referred to as reactive diluents when the polymerizable resin is already liquid at room temperature (i.e., about 25° C.). When TATHEIC is used, the combination of TATHEIC/TMPTA is considered as the polymerizable resin in the slurries and dispersions of the invention. The weight ratio of TATHEIC/TMPTA may range from about 1:2 to about 2:1, more preferably from about 1:1.7 to about 1.7:1, most preferably 1:1.

Acrylated isocyanurate oligomer resins are the presently preferred addition polymerizable resins. Isocyanurate resins useful in the invention include those having at least one pendant acrylate group, which are described in U.S. Pat. No. 4,652,275, incorporated herein by reference. As mentioned previously, one particularly preferred isocyanurate material is TATHEIC dissolved in TMPTA.

Acrylated urethane oligomer resins are preferably acrylate esters of hydroxy-terminated, isocyanate-extended polyester or polyether polyols esterified with low molecular weight (less than about 500) acrylates (such as 2-hydroxyethyl acrylate). The number average molecular weight of preferred acrylated urethane oligomer resins ranges from about 300 to about 10,000, more preferably from about 400 to about 7,000. Examples of commercially available acrylated urethane oligomer resins are those marketed under the trade designations "UVITHANE 782" (available from Morton Thiokol Chemical) and "CMD 6600", "CMD 8400", and "CMD 8805" (available from Radcure Specialties).

Acrylated epoxy oligomer resins are acrylate esters of epoxy resins, such as the diacrylate esters of bisphenol-A epoxy resin. Examples of commercially available acrylated epoxy oligomer resins include those known under the trade designations "CMD 3500", "CMD 3600", and "CMD 3700", also available from Radcure Specialties.

Non-radiation curable urethane resins, epoxy resins, and polymeric isocyanates may also serve as the polymerizable resin in slurries and dispersions of the invention. Urethanes useful in the invention include those disclosed in U.S. Pat.

No. 4,933,373, incorporated by reference herein, which are the reaction product of short-chain, active hydrogen functional monomer, such as trimethylolpropane monoallyl ether, ethanol amine, and the like; long-chain, active hydrogen functional diene prepolymer, such as the hydroxy-terminated polybutadiene commercially available from Atochem Inc. under the trade designation "Polybd R-45HT"; a polyisocyanate, and a crosslinking initiator. Suitable crosslinking initiators are organic peroxides, such as benzoyl peroxide, and the like. Urethane catalysts may be used, although not essential, such as those mentioned in U.S. Pat. No. 4,202,957.

Epoxy resins have an oxirane (epoxide) ring and are polymerized by ring opening. Epoxy resins which lack ethylenically unsaturated bonds require the use of photoinitiators. These resins can vary greatly in the nature of their backbones and substituent groups. For example, the backbone may be of any type normally associated with epoxy resins and substituent groups thereon can be any group free of an active hydrogen atom that is reactive (or capable of being made reactive) with an oxirane ring at room temperature. Representative examples of acceptable substituent groups include halogens, ester groups, ether groups, sulfonate groups, siloxane groups, nitro groups and phosphate groups. Examples of preferred epoxy resins lacking ethylenically unsaturated groups include 2,2-bis[4-(2,3-epoxypropoxy) -phenyl]propane (diglycidyl ether of bisphenol A) and commercially available materials under the trade designation "Epon 828", "Epon 1004" and "Epon 1001F" available from Shell Chemical Co., "DER-331", "DER-332", and "DER-334" available from the Dow Chemical Co. Other suitable epoxy resins lacking ethylenically unsaturated groups include glycidyl ethers of phenol formaldehyde novolak resins (e.g., "DEN-431" and "DEN-438" available from the Dow Chemical Co.).

Diluents may also be used in the slurries and dispersions of the invention. As used herein the term "diluent" connotes a low molecular weight (less than 500) organic material that may or may not decrease the viscosity of the binder precursor to which they are added. Diluents may be reactive with the resin or inert.

Low molecular weight acrylates are one preferred type of reactive diluent. Acrylate reactive diluents preferred for use in the invention typically have a molecular weight ranging from about 100 to about 500, and include ethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Methyl methacrylate and ethyl methacrylate may also be used.

Other useful reactive diluents include monoaliyl, polyallyl, and polymethallyl esters and amides of carboxylic acids (such as diallyl phthalate, diallyl adipate, and N,N-diallyladipamide); tris(2-acryloyloxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

Addition polymerizable resins require an initiator, as previously mentioned. Examples of useful initiators that generate a free radical upon exposure to radiation or heat include organic peroxides, azo compounds, quinones, benzophenones, nitroso compounds, acryl halides, hydrozones, mercapto compounds, pyrylium compounds, triacrylimidazoles, bisimidazoles, chloroalkyltriazines, benzoin ethers, benzil ketals, thioxanthones, and acetophenone derivatives, and mixtures thereof. Examples of photoinitiators that when exposed to visible radiation generate a free radical are described in U.S. Pat. No. 4,735,632, incorporated herein by reference.

Cationic photoinitiators generate an acid source to initiate polymerization of addition polymerizable resins. Cationic photoinitiators can include a salt having an onium cation and a halogen containing complex anion of a metal or metalloid. Other useful cationic photoinitiators include salts of organometallic complex cations and halogen-containing complex anions of a metal or metalloid, which are further described in U.S. Pat. No. 4,751,138, incorporated herein by reference. Still other useful cationic photoinitiators are organometallic salts and onium salts, described in U.S. Pat. No. 4,985,340, and European Patent Applications 306,161 and 306,162, both published Mar. 8, 1989, all incorporated herein by reference. Yet other useful cationic photoinitiators include ionic salts of an organometallic complex in which the metal is selected from the elements of Periodic Group IVB, VB, VIB, VIIB and VIIIB, such salts being described in European Patent Application 109,581 (published May 30, 1984), incorporated herein by reference.

The uncured resins are typically present in the binder precursor compositions of the invention from about 20 to about 95 dry weight percent of the total weight of solution or slurry, as the case might be, and preferably from about 30 to about 80.

Other Useful Resins

Depending on the particular abrasive article to be formed, thermally curable resins may benefit from the addition of modifying of particles.

Novolak phenolic resins having a molar ratio of aldehyde to phenol of less than 1:1 are one example. Resole phenolic resins do not benefit as the hydrogen bonding between modifying particles and hydroxyl groups of the resin typically increases the viscosity of resole phenolic resins. Examples of useful commercially available phenolic resins include those known by the trade designations "Durez" and "Varcum" from Occidental Chemicals Corp.; "Resinox" from Monsanto; and "Aerofene" and "Arotap" from Ashland Chemical Co.

It should be understood that polymerizable resins which do not benefit from the addition of modifying particles described herein may be used, for example, as size or make coatings in coated and nonwoven abrasive articles.

Curing Conditions

Thermally curable resins such as phenolic resins and urea-formaldehyde resins are cured by thermal energy. Addition polymerizable resins require an initiator such as a photoinitiator and/or radiation energy. Preferably photoinitiators and radiation energy are used simultaneously. Indeed, addition polymerization rates generally increase with temperature, so that these resins may be simultaneously exposed to a heat source. The total mount of energy required is primarily dependent upon the resinous adhesive chemistry and secondarily on the thickness and optical density of the binder precursor. For thermal energy, the oven temperature will typically range from about 50° C. to about 250° C. for about 15 minutes to about 16 hours. For free radical addition polymerization in the absence of heating while exposing to solely to UV or visible radiation, in order to fully polymerize all ethylenically unsaturated monomer, the UV or visible energy level should be at least about 100 milliJoules/cm$^2$, more preferably ranging from about 100 to about 700 milliJoules/cm$^2$, particularly preferably from about 400 to about 600 milliJoules/cm$^2$.

Ultraviolet radiation refers to electromagnetic radiation having a wavelength within the range of about 200 to about 400 nanometers, preferably within the range of about 250 to 400 nanometers. Visible radiation refers to electromagnetic radiation having a wavelength within the range of about 400 to about 800 nanometers, and preferably in the range of about 400 to about 550 nanometers.

Electron beam irradiation, a form of ionizing radiation, can be used at an energy level of about 0.1 to about 10 Mrad, and preferably at an energy level of about 1 to about 10 Mrad, at accelerating potential ranging from about 150 to about 300 kiloelectron volts.

Backing Materials for Coated Abrasives

The backing can be any number of various materials conventionally used as backings in the manufacture of coated abrasives, such as paper, cloth, film, vulcanized fiber, woven and nonwoven materials, and the like, or a combination of two or more of these materials or treated versions thereof. The choice of backing material will depend on the intended application of the abrasive article. The strength of the backing should be sufficient to resist tearing or other damage in use, and the thickness and smoothness of the backing should allow achievement of the product thickness and smoothness desired for the intended application. The adhesion of the inventive slurry or dispersion to the backing should also be sufficient to prevent significant shedding of individual abrasive particles or the abrasive coating during normal use. In some applications it is also preferable that the backing be waterproof. The thickness of the backing should be sufficient to provide the strength desired for the intended application; nevertheless, it should not be so thick as to affect the desired flexibility in the coated abrasive product. It is preferred that the backing be a polymeric film, such as polyester film, for lapping coated abrasives, and that the film be primed with a material, such as ethylene acrylic acid copolymer, to promote adhesion of the inventive slurry or dispersion and resulting abrasive composite to the film. It is also preferred that the backing be transparent to ultraviolet or visible radiation.

In the case of a woven backing, it is sometimes preferable to fill the interstices of the backing with at least one coating before the application of the inventive slurry or dispersion. Coatings used for this purpose are called saturant, back or presize coatings, depending on how and to what surface of the backing the coating is applied.

The backing may comprise a laminate of backings made by laminating two or more plies of either similar or dissimilar backing materials. For example, the backing can be laminated to a stiffer, more rigid substrate, such as a metal plate, to produce a coated abrasive article having an abrasive coating supported on a rigid substrate.

The surface of the backing not containing the abrasive coating may also contain a pressure-sensitive adhesive or a hook and loop type attachment system so that the abrasive article can be secured to a back-up pad. Examples of pressure-sensitive adhesives suitable for this purpose include rubber-based adhesives, acrylate-based adhesives, and silicone-based adhesives.

Abrasive Particles

Individual abrasive particles may be selected from those commonly used in the abrasive art, however, the abrasive particles (size and composition) will be chosen with the application of the abrasive article in mind. In choosing an appropriate abrasive particle, characteristics such as hardness, compatibility with the intended workpiece, particle size, reactivity with the workpiece, as well as heat conductivity may be considered.

The composition of abrasive particles useful in the invention can be divided into two classes: natural abrasives and manufactured abrasives. Examples of natural abrasives include: diamond, corundum, emery, garnet, buhrstone, chert, quartz, sandstone, chalcedony, flint, quartzite, silica, feldspar, pumice and talc. Examples of manufactured abrasives include: boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

Abrasive particles useful in the invention typically and preferably have a particle size ranging from about 0.1 micrometer to about 1500 micrometers, more preferably ranging from about 0.1 micrometer to about 1300 micrometers. The abrasive particles preferably have an average particle size ranging from about 0.1 micrometer to about 700 micrometers, more preferably ranging from about 1 to about 150 micrometers, particularly preferably from about 1 to about 80 micrometers. It is preferred that abrasive particles used in the invention have a Moh's hardness of at least 8, more preferably above 9; however, for specific applications, softer particles may be used.

The term "abrasive particle" includes agglomerates of individual abrasive particles. An abrasive agglomerate is formed when a plurality of abrasive particles are bonded together with a binder to form a larger abrasive particle which may have a specific particulate structure. The plurality of particles which form the abrasive agglomerate may comprise more than one type of abrasive particle, and the binder used may be the same as or different from the binders used to bind the agglomerate to a backing.

Although not required, when curing by use of radiation, curing appears to be faster if the refractive index of the abrasive particles matches or is close to the refractive index of the particular resin being used.

Fillers

Generally, fillers are inorganic particulate matter which comprise materials which are substantially inert or nonreactive with respect to the grinding surface acted upon by the abrasive. Occasionally, however, active (i.e. reactive) fillers are used, sometimes referred to in the abrasives art as grinding aids. These fillers interact beneficially with the grinding surface during use. In particular, it is believed in the art that the grinding aid may either 1) decrease the friction between the abrasive particles and the workpiece being abraded, 2) prevent the abrasive particle from "capping", i.e. prevent metal particles from becoming welded to the tops of the abrasive particles, 3) decrease the interface temperature between the abrasive particles and the workpiece or 4) decrease the required grinding force.

Grinding aids encompass a wide variety of different materials and can be inorganic or organic based. Examples of chemical groups of grinding aids useful in this invention include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron titanium. Other miscellaneous grinding aids include sulfur, organic sulfur compounds, graphite and metallic sulfides. It is also within the scope of this invention to use a combination of different grinding aids and in some instances this may produce a synergistic effect. The above mentioned examples of grinding aids is meant to be a representative showing of grinding aids, and it is not meant to encompass all grinding aids.

Grinding aids are preferably used in slurries and binder precursor dispersions of the invention in amounts ranging from about 0.1 to about 10 dry weight percent, more preferably from about 0.5 to about 5.0 weight percent, based on total weight of binder precursor solution. If non-reactive fillers are employed they may be used up to 50 dry weight percent.

As stated previously, the addition of a filler typically increases the hardness and toughness of the cured binder. The filler is typically and preferably an inorganic particulate having an average particle size ranging from about 1 micrometer to about 100 micrometers, preferably from about 5 to about 50 micrometers, and most preferably from about 10 to about 25 micrometers. Moreover, the filler will preferably have a specific gravity in the range of 1.5 to 4.50, and the average particle size of the filler will preferably be less than the average particle size of the abrasive particles.

When fillers are employed in the slurries and dispersions of the invention, curing by radiation appears to be faster when the refractive index of the filler matches or is close to the refractive index of the particular resin being used.

Examples of useful non-reactive fillers for this invention include: metal carbonates such as calcium carbonate (in the form of chalk, calcite, marl, travertine, marble or limestone), calcium magnesium carbonate, sodium carbonate, and magnesium carbonate; silicas such as quartz, glass beads, glass bubbles and glass fibers; silicates such as talc, clays, feldspar, mica, calcium silicate, calcium metasilicate, sodium aluminosilicate, and sodium silicate; metal sulfates such as calcium sulfate, barium sulfate, sodium sulfate, aluminum sodium sulfate, and aluminum sulfate; gypsum; vermiculite; wood flour; aluminum trihydrate; carbon black; metal oxides such as calcium oxide (lime), aluminum oxide, titanium dioxide, alumina hydrate, alumina monohydrate; and metal sulfites such as calcium sulfite.

Coupling Agents

The inventive slurries, dispersions, and articles may also contain coupling agents if further viscosity reduction is required, such as disclosed by DeWald, U.S. Pat. No. 4,871,376, incorporated by reference herein for its relevant teaching. (Applicant, of course, does not incorporate that portion of DeWald which states that particles having particle size less than 2 micrometers are to be avoided, since the modifying particles described herein are much smaller than this.) Preferred coupling agents operate through two different reactive functionalities: an organofunctional moiety and an inorganic functional moiety. When a coated abrasive binder precursor system (i.e. resin/filler mixture) is modified with a coupling agent, the organofunctional group of the coupling agent becomes bonded to or otherwise attracted to or associated with the uncured resin. The inorganic functional moiety appears to generate a similar association with the dispersed inorganic filler. Thus, the coupling agent acts as a bridge between the organic resin and the inorganic filler at the resin/filler interface. In various systems this results in:

1. improvement in retention of dispersed filler within the uncured and cured resins;

2. reduction of binder precursor viscosity; and/or 3. improvement in abrasive product performance, life, and water insensitivity.

Herein, the term "coupling agent" will be meant to include mixtures of coupling agents.

An example of a coupling agent found suitable for this invention is the methacryloxypropyl silane known under the trade designation "A-174" from Union Carbide Corporation. Other suitable coupling agents are zircoaluminates, and titanates. Further examples which illustrate the use of silane, titanate, and zircoaluminate coupling agents are disclosed in U.S. Pat. No. 4,871,376, which was previously partially incorporated herein by reference.

Binder Precursor Additives

The slurries and binder precursor dispersions of the invention, and thus the cured binders, may also comprise optional additives common to the skilled artisan in the abrasive art such as fibers, lubricants, wetting agents, surfactants, pigments, dyes, plasticizers and suspending agents. The amounts of these materials will depend on the desired properties of the binder and the final use of the abrasive article which is being manufactured.

Bonded Abrasives

To make a bonded abrasive, a slurry of the invention is made consisting essentially of a polymerizable resin, abrasive particles and modifying particles. Optionally, coupling agents may also be introduced into the slurry either before or after the slurry is poured into a mold. If a silane coupling agent is used, it is not necessary to coat the mold inner surface with a mold release agent. However, when desired, a mold release material may be coated on the surface of the mold to be exposed to the slurry, such as the mold release known under the trade designation "IMS Silicon Spray Parting Agent", no. S-512. Alternatively, the mold could have a non-stick surface, made of a material such as polytetrafluoroethylene or the like.

The slurry is then poured into the selected mold, and subsequently subjected to curing conditions as previously described. Optionally, pressure may be applied to the system during curing. Once the resin is cured, the resulting bonded abrasive is removed from the mold.

Nonwoven Abrasive Articles

Nonwoven abrasive articles comprise an open, lofty, three-dimensional web of fibers bound together at points where they meet by a binder. The binder of such a construction may be made using the slurries or dispersion of the invention. Methods of making nonwoven abrasive articles are described in U.S. Pat. No. 2,958,593 (Hoover), which is incorporated herein by reference.

Lapping Abrasives and Methods of Production

Lapping abrasives are a type of coated abrasive. To make a lapping coated abrasive in accordance with one method of the invention, first a slurry within the invention is coated onto at least one side of a backing. The preferred backing is a polymeric film, such as polyester film that contains an ethylene acrylic acid copolymer primer. The slurry can be applied, for example, by spraying, roll coating, or knife coating. Second, the slurry-coated backing is contacted with the outer surface of a patterned production tool. The slurry wets the pattern surface to form an intermediate article. Third, the slurry is subjected to curing conditions as previously described which at least partially cures or gels the resin in the slurry before the intermediate article is removed from the outer surface of the production tool. Fourth, the intermediate article is removed from the production tool. The four steps are preferably carried out continuously. Alternatively, the slurry may be first applied to the production tool, the slurry-coated production tool contacted with a backing with the slurry between the tool and backing, and the slurry exposed to curing conditions. A preferred method for making a lapping coated abrasive is described, except for the novel aspects described in the present invention, in assignee's U.S. Pat. No. 5,152,917, incorporated herein by reference.

In each of the methods wherein a patterned tool is coated with a slurry, it is most advantageous if the slurry has a viscosity that will allow the slurry to flow into depressions or cavities in the patterned surface. Thus, the slurries of the present invention, having viscosity which is lower than the same slurry without the modifying particles, measured at the same temperature, are quite advantageous. In methods employing a production tool, the production tool may be coated with a release agent, such as a silicone material, to enhance the release of the intermediate article from the patterned tool.

Because the pattern of the production tool imparts a pattern to the abrasive articles of the invention, these methods are particularly useful in making "structured" abrasive articles. A structured abrasive article is an abrasive article wherein composites, comprising abrasive particles distributed in a binder, have a predetermined shape, and are disposed in a predetermined array on a backing.

Additional Methods of Making Coated Abrasives

The present invention also relates to methods of manufacturing conventional coated abrasive articles incorporating the slurries and dispersions of the invention.

In one method in accordance with the invention employing slurries of the invention, a backing may be saturated with a saturant coating precursor by any conventional technique such as dip coating or roll coating, after which the saturant coating precursor is partially cured ("precure"). After the saturant coating precursor is partially cured, a slurry may be applied by any conventional technique such as roll coating, die coating or knife coating. The slurry is then exposed to conditions sufficient to at least partially cure or gel the polymerizable resin in the slurry.

A size coating precursor may then be applied over the abrasive grains by any of the above-mentioned conventional techniques, and subjected to conditions to effect a partial cure.

One or more supersize coating precursors may be applied over the partially cured size coating by any conventional technique. Each of the coatings may be fully cured, partially cured or dried after it is applied. After the last coating precursor is applied, and if necessary, any remaining partially cured or dried coatings are fully cured. In these methods, the optional size and supersize coatings may comprise binder materials that are commonly utilized in the coated abrasive art (for example resole phenolic resins), or may also comprise the inventive slurries or binder precursor dispersions of the invention.

The abrasive articles produced and used in the Examples below were made according to the General Procedure for Preparing the Abrasive Article, and the abrasive articles were tested according to the test procedures described below.

General Procedure for Preparing the Abrasive Article

The abrasive articles employing slurries of the invention were made generally in accordance with assignee's U.S. Pat. No. 5,152,917 (Pieper et al.), which was previously incorporated herein by reference. The slurry used in each case was coated onto a production tool having a pyramidal type pattern such that the slurry filled the tool. The pyramids were placed such that their bases were butted up against one another. The width of the pyramid base was about 530 micrometers and the pyramid height was about 530 micrometers. This pattern is illustrated in FIG. 1 of the Pieper et al. patent.

Next, a 130 micrometer thick polyester film having an ethylene acrylic acid copolymer primer was pressed against the production tool by means of a roller so that the slurry wetted the front surface of the polyester film.

Ultraviolet light was then transmitted through the polyester film and into the slurry. The ultraviolet light initiated the polymerization of the radiation curable resin contained in the slurry, resulting in the slurry being transformed into an abrasive composite, with the abrasive composite being adhered to the polyester film backing. The ultraviolet light sources used were two bulbs known under the trade designation "Aetek H", which operated at 762 watts/cm of bulb width. Finally, the polyester film/abrasive composite was separated from the production tool, providing a lapping coated abrasive.

TEST METHODS

Viscosity Test Using Stress Rheometer

This test measured the viscosity of slurries and dispersions at room temperature using an instrument known under the trade designation "VOR", available commercially from Bohlin Rheometer Systems. In this viscosity test, a number C-14 cup and bob were used with a 22.64 gram torque bar. A sample to be tested was placed in the cup and the bob lowered into the sample so that the bob was partially immersed in the sample. The bob was suspended in the cup by attaching one end of the torque bar to the bob, the other end to a torque measurement device within the system (the bob, torque bar, and measurement device come already assembled from Bohlin). To begin a test, the rheometer system rotates the bob, the sample providing resistance to rotation of the bob. A 10 second delay was used before reading the viscosity in centipoise, and three measurements were averaged to obtain the viscosity of a given sample. The measurement interval was 120 seconds for each measurement. The temperature of each measurement was generally between 24.9°–25.2° C.

Finish Quality Test (Ra)

Finish quality was measured in accordance with the commonly used statistical parameter "Ra", which is a measure of the average surface roughness. Ra is defined in the publication "An Introduction to Surface Texture and Part Geometry" by Industrial Metal Products Incorporated, the complete disclosure of which is incorporated herein by reference, as the arithmetic average of the scratch depth in microinches. The ideal case is where a large amount of material is removed ("cut") from a workpiece while the Ra value is low.

Disc Test Procedure I

The coated abrasive article to be tested in each example was converted to a 10.2 cm diameter disc and secured to a foam back-up pad by means of a pressure sensitive adhesive. The coated abrasive disc and back-up pad assembly was installed on a testing machine known under the trade designation "Schiefer" and the coated abrasive disc was used to abrade a cellulose acetate butyrate polymer. The load was 4.5 kg. All of the testing was done underneath a water flood. The endpoint of the test was 500 revolutions or cycles of the coated abrasive disc. The amount of cellulose acetate butyrate polymer removed and the surface finish (Ra) of the cellulose acetate butyrate polymer were measured at the end of the test.

Disc Test Procedure II

The Disc Test Procedure II was the same as Disc Test Procedure I, except that the workpiece was polymethyl methacrylate.

Disc Test Procedure III

The coated abrasive disc to be tested was mounted on a beveled aluminum back-up pad, and used to grind the face of a 1.25 cm by 18 cm 1018 mild steel workpiece. The disc was driven at 5,500 rpm while the portion of the disc overlaying the beveled edge of the back-up pad contacted the workpiece at about a 4.5 kg load. Each disc was used to grind a separate workpiece for a one minute interval until burning occurred on the workpiece. The initial cut was the amount of metal removed in the first minute of grinding. The total cut was the summation of the metal removed throughout the test.

Disc Test Procedure IV

The abrasive article to be tested was converted to a 10.2 cm diameter disc mounted on a back-up pad by double stick tape known under the trade designation "ES", available from 3M. The workpiece was a 1018 mild steel ring having a 5 cm outer diameter and 4.4 cm inner diameter. The load between the abrasive disc and the workpiece interface was 13.6 kg. Also, at this interface was applied a continuous drop per second of an oil lubricant. During abrading, the abrasive disc did not rotate, but rocked in a forward and sideways manner. Additionally during abrading, the workpiece oscillated. The test endpoint was one minute and the amount of metal abraded during this interval was determined.

Belt Test Procedure I

The coated abrasive to be tested was converted into a 7.6 cm by 335 cm endless belt and tested on a constant load surface grinder. A preweighed, 1018 mild steel workpiece approximately 2.5 cm by 5 cm by 18 cm was mounted in a holder. The workpiece was positioned vertically, with the 2.5 cm by 18 cm face facing an approximately 36 cm diameter 85 Shore A durometer serrated rubber contact wheel with one on one lands, over which was entrained the coated abrasive belt. The workpiece was then reciprocated vertically through an 18 cm path at the rate of 20 cycles per minute, while a spring loaded plunger urged the workpiece against the belt with a load of 4.5 kg as the belt was driven at about 2050 meters per minute. After one minute of elapsed grinding time, the workpiece holder assembly was removed and re-weighed. The amount of stock removed was calculated by subtracting the weight of the workpiece holder assembly after abrasion from its original weight. Then a new, preweighed workpiece and holder were mounted on the equipment. The initial cut was the mount of metal removed the first minute of grinding. The final cut was the amount of metal removed in the last minute of abrading. The total cut was the total amount of metal removed. The test endpoint occurred when the abrasive article began to burn the workpiece. In some instances the surface finish (Ra) of the workpiece was measured. The initial surface finish Ra was taken after 60 seconds of abrading, and the final surface finish was taken after the last minute of abrading.

Materials Description

The following abbreviations and trade names are used throughout the examples.

TATHEIC triacrylate of tris(hydroxyethyl) isocyanurate

PH1 2,2-dimethoxy-1-2-diphenyl-1-ethanone, commercially available from Ciba Geigy Company under the trade designation "Irgacure 651"

TMPTA trimethylol propane triacrylate

WA0 white fused aluminum oxide abrasive grain

CA01 calcium carbonate filler having an average particle size of 13 micrometers

CA02 calcium carbonate filler having an average particle size of 2.5 micrometers MSCA gamma-methacryloxypropyltrimethoxysilane, known under the trade designation "A-174", from Union Carbide RP1 resole phenolic resin, 76% solids in WPS WPS 90/10 weight ratio of water/PS PS propylene glycol mono-methyl ether ASP amorphous silica particles having an average surface area of 50 $m^2/g$, and average particle size of 40 millimicrometers, commercially available from Degussa Corp, Ridgefield Park, N.J. under the trade designation "0X-50"

PSP precipitated silica particles having an average surface area of 100 $m^2/g$, and average particle size of 15 millimicrometers, commercially available from Degussa Corp, Ridgefield Park, N.J. under the trade designation "P-820"

A200 fumed silica particles having an average surface area of 200 $m^2/g$, and average particle size of 12 millimicrometers, commercially available from Degussa Corp, Ridgefield Park, N.J. under the trade designation "AEROSIL 200"

PAPI polyisocyanate mixture derived by direct phosgenation of aniline-formaldehyde condensates having an isocyanate equivalent weight of 140 and a functionality of 3.0, commercially available under the trade designation "PAPI 2020"

EPON 828 an epoxy resin which is the diglycidyl ether of bisphenol A, 2,2-bis[4-(2,3-epoxypropoxy) -phenyl] propane, available from Shell Chemical Co., Houston, Tex.

EXAMPLES

The following non-limiting Examples will further illustrate the invention. All parts, percentages, ratios, and the like, in the examples are by weight unless otherwise indicated.

Viscosity Examples 1 through 4 and Comparative Examples A–D

For Comparative Examples A through D, slurries were prepared by mixing together 50 parts TATHEIC, 50 parts TMPTA, 2 parts PH1 and 200 parts WAO. For Examples 1 through 4, the slurries additionally contained one part of ASP. The viscosity of each slurry was measured by the Stress Rheometer Test. Table 1 lists the average particle size of the abrasive particles for each example and the resulting viscosity in centipoise.

TABLE 1

| Example | Abrasive Avg. Particle Size (micrometers) | slurry viscosity (cps) |
|---|---|---|
| A | 15 | 8,000 |
| 1 | 15 | 5,000 |
| B | 12 | 7,000 |
| 2 | 12 | 2,100 |
| C | 20 | 17,000 |
| 3 | 20 | 6,000 |
| D | 40 | 25,000 |
| 4 | 40 | 18,000 |

The data in Table 1 show that the addition of ASP to the slurry in Examples 1 through 4 significantly reduced the resulting viscosity.

Performance Examples 5–7 and Comparative Examples E–H

This set of examples compared the performance of abrasive articles made from slurries containing ASP and abrasive articles made from slurries not containing ASP. The abrasive articles were made in accordance with the General Procedure for Preparing the Abrasive Articles. The resulting abrasive articles were tested according to Disc Test Procedures I and II and the Finish Quality Test (Ra), with results shown in Table 2.

For Example 5 the slurry was the same as that in Example 2.

For Example 6 the slurry was the same as that used in Example 1.

For Example 7 the slurry was the same as that used in Example 3.

For Comparative Example E the slurry was the same as that used in Comparative Example B.

For Comparative Example F the slurry was the same as that used in Comparative Example A.

For Comparative Example G the slurry was the same as that used in Comparative Example C.

Comparative Example H consisted of grade 1500 (8 micrometer average particle size) coated abrasive commercially available from the 3M Company, St. Paul, Minn. under the trade designation "Microfine Wetordry" paper.

TABLE 2

| | Disc Procedure I | | Disc Procedure II | |
|---|---|---|---|---|
| Example | Cut (g) | Ra | Cut (g) | Ra |
| E | 0.057 | 4 | 0.031 | 4 |
| 5 | 0.045 | 5 | 0.034 | 4 |
| F | 0.096 | 7 | 0.046 | 6 |
| 6 | 0.056 | 5 | 0.022 | 3 |

TABLE 2-continued

| | Disc Procedure I | | Disc Procedure II | |
|---|---|---|---|---|
| Example | Cut (g) | Ra | Cut (g) | Ra |
| G | 0.289 | 9 | 0.159 | 8 |
| 7 | 0.258 | 8 | 0.132 | 2 |
| H | 0.197 | 4 | 0.113 | 3 |

The data in Table 2 show that the addition of ASP to the slurry allowed the making of a coated abrasives which provided a smoother surface finish compared with similar coated abrasives made not using ASP.

Viscosity Comparative Examples I–N

In an attempt to determine if the introduction of ASP to aqueous binder precursor solutions lowered the viscosity of the solutions, aqueous binder precursor solutions were prepared (Comparative Examples I–N) and their viscosities measured, the solutions having composition as show in Table 3. The binder precursor solutions were prepared by thoroughly mixing the materials listed with an air-driven stirrer. The viscosity values listed in Table 3 have the units of centipoise (cps) and were measured using a Brookfield Viscometer, Model DV-II, #2 spindle. The temperature (° C.) of each viscosity measurement is indicated in () following the viscosity value. The viscosity value given in Table 3 was the value obtained after the spindle rotated for 5 minutes.

TABLE 3

| | Ingredient (g) | | | | |
|---|---|---|---|---|---|
| Example | RP1 | CAO1 | WPS | ASP | vis. (temp) |
| I | 530.5 | 436.8 | 32.7 | 1.0 | 1640 (42) |
| J | 530.5 | 436.8 | 32.7 | — | 1270 (42) |
| K | 362.1 | 584.8 | 128.1 | 1.0 | 578 (39) |
| L | 362.1 | 584.8 | 128.1 | — | 484 (39) |
| M | 492.6 | 405.6 | 201.8 | 1.0 | 812 (38) |
| N | 492.6 | 405.6 | 201.8 | — | 741 (38) |

The viscosity data in Table 3 show that the addition of ASP actually provided higher viscosity aqueous solutions and thus the effect of ASP in aqueous solutions was the opposite of the effect of ASP in slurries and dispersions of the invention. It was theorized that this was due to more hydrogen bonding in aqueous solutions.

Performance Example 8 and Comparative Example O

The abrasive articles for this set of Examples were made according to General Procedure for Preparing the Abrasive Article, and then tested according to Belt Test Procedure I. The test results can be found in Table 4. The abrasive article for Example 8 was made using an slurry that consisted of 647 parts of grade P-180 WAO (average particle size of 78 micrometers), 20 parts ASP, 164 parts of TMPTA, 164 parts of TATHEIC, 6.6 parts PH1 and 5 parts of MSCA.

Comparative Example O was a coated abrasive known under the trade designation "Three-Mite Resin Bond X", commercially available from the 3M Company, St. Paul, Minn. This coated abrasive had grade P-180 WAO abrasive particles adhered to X weight polyester cloth with a phenolic resin which had no coupling agent or ASP added thereto.

TABLE 4

| Belt Test Procedure I | | | |
|---|---|---|---|
| Example | Initial Cut (g) | Total Cut (g) | Time to burning (minutes) |
| 8 | 16.8 | 580.5 | 39 |
| O | 31.1 | 347.5 | 18 |

The data in Table 4 show that a coated abrasive made in accordance with the invention, .while having lower initial cut, had a higher total cut value and took over twice as long to begin to burn compared with a representative commercial product not incorporating ASP.

Performance Example 9 and Comparative Example P

The abrasive article for Example 9 was made according to the General Procedure for Preparing the Abrasive Article. The slurry consisted of 657 parts of P-100 WAO (average particle size 127 micrometers), 10 parts ASP, 164 parts of TMPTA, 164 parts of TATHEIC, 6.6 parts PH1, and 5 parts of MSCA. Comparative Example P was a coated abrasive commercially available from the 3M Company, St. Paul, Minn., known under the trade designation "Three-Mite Resin Bond X" which had grade P-100 WAO bonded to an X weight polyester cloth by a phenolic resin having no coupling agent or ASP therein. The abrasive articles of Example 9 and Comparative Example P were tested according to Belt Test Procedure I and the test results can be found in Table 5. These values in Table 5 were an average of four belts.

TABLE 5

| Belt Test Procedure I | | | | |
|---|---|---|---|---|
| Example | Total Cut (g) | Time to burning (minutes) | Initial Ra | Final Ra |
| 9 | 246.2 | 22 | 76 | 77 |
| P | 371.6 | 21 | 65 | 53 |

The data shown in Table 5 indicate that the coated abrasive of the invention performs comparatively with a commercial coated abrasive not including ASP and MSCA.

Performance Examples 10–11 and Comparative Examples Q–T

The abrasive articles for Examples 10 and 11 were made according to General Procedure for Preparing the Abrasive Article.

The slurry for Example 10 consisted of 657 parts of 40 micrometer average particle size WAO, 10 parts ASP, 164 parts of TMPTA, 164 parts of TATHEIC, 6.6 parts PH1, and 5 parts of MSCA.

The slurry for Example 11 consisted of 657 parts of 20 micrometer average particle size WAO, 10 parts ASP, 164 parts of TMPTA, 164 parts of TATHEIC, 6.6 parts PHi, and 5 parts of MSCA.

Comparative Example Q was a coated abrasive known under the trade designation "Three-Mite Resin Bond X", commercially available from the 3M Company, St. Paul, Minn. This coated abrasive consists of grade P-320 (average particle size 34 micrometers) adhered to X weight cotton cloth with a phenolic binder resin.

Comparative Example R was a coated abrasive commercially available from the 3M Company, St. Paul, Minn. under the trade designation "Three-Mite Resin Bond X". This coated abrasive consisted of grade P-220 (average particle size 66 micrometers) adhered to X weight polyester cloth with a phenolic binder resin.

Comparative Example S was a coated abrasive known under the trade designation "Imperial Microfinishing Film" commercially available from the 3M Company, St. Paul, Minn., which had 20 micrometer average particle size WAO adhered to a polyester backing by a phenolic resin not having MSCA or ASP therein.

Comparative Example T was a coated abrasive known under the trade designation "Multicut Resin Bond X" commercially available from the 3M Company, St. Paul, Minn., which had grade P-600 WAO (average particle size 26 micrometers) adhered to a polyester cloth backing by a phenolic resin not having MSCA or ASP therein.

The abrasive articles for this set of Examples were tested according to Belt Test Procedure I and the Finish Quality Test and the test results can be found in Table 6. The values in Table 6 were an average of two or more belts.

TABLE 6

| Belt Test Procedure I | | | |
|---|---|---|---|
| Example | Total Cut (grams) | Time to burning (minutes) | Initial Ra |
| 10 | 114.7 | 12 | 25 |
| Q | 86.2 | 8 | 35 |
| 11 | 15.1 | 7 | 16 |
| S | 1.5 | 2 | 16 |
| R | 152.2 | 20 | 44 |
| T | 20.0 | 10 | 31 |

The data in Table 6 show that the coated abrasives of the invention last longer, provide better cut and yield better or equivalent surface finish than the comparative examples.

Performance Example 12 and Comparative Example U

The abrasive article for Example 12 was made according to the General Procedure for Preparing the Abrasive Article. The slurry for Example 12 consisted of 657 parts of 40 micrometer average particle size WAO, 10 parts ASP, 164 parts of TMPTA, 164 parts of TATHEIC, 6.6 parts PH1 and 5 parts of MSCA.

Comparative Example U was a coated abrasive known under the trade designation "Three-Mite Resin Bond X" which had grade P-400 WAO (average particle size 35 micrometers) adhered to an X weight polyester cloth, and was commercially available from the 3M Company, St. Paul, Minn.

The abrasive articles from Example 12 and Comparative Example U were laminated to individual 0.76 millimeter thick vulcanized fiber backings using double sided adhesive tape. The resulting material was in each case converted into a 17.8 cm diameter disc with a 2.2 cm center hole.

The discs for Example 12 and Comparative Example U were then tested according to Disc Test Procedure III and the test results can be found in Table 7.

TABLE 7

| Disc Test Procedure III | | |
|---|---|---|
| Example | Total Cut (g) | Time to Burning (minutes) |
| 12 | 10.8 | 8 |
| U | 0.7 | 3 |

The data presented in Table 7 show that the disc incorporating the coated abrasive made in accordance with the teaching of the invention performed significantly better in terms of total cut and time to burning than did the disc which incorporated a comparative coated abrasive.

Performance Example 13 and Comparative Example V

The abrasive article for Example 13 was made according to General Procedure for Preparing the Abrasive Article. The slurry for Example 13 consisted of 657 parts of 20 micrometer average particle size WAO, 10 parts ASP, 164 parts of TMPTA, 164 parts of TATHEIC, 6.6 parts PH1, and 5 parts of MSCA.

Comparative Example V was a coated abrasive known under the trade designation "Imperial Microfinishing Film" commercially available from the 3M Company, St. Paul, Minn., which had 20 micrometer average particle size WAO abrasive particles adhered to a polyester film backing with a phenolic resin which did not contain ASP or MSCA.

The abrasive articles of Example 13 and Comparative Example V were tested according to Disc Test Procedure IV and the test results can be found in Table 8.

TABLE 8

| Disc Test Procedure IV | |
|---|---|
| Example | Total cut (grams) |
| 13 | 0.502 |
| V | 0.389 |

The data exhibited in Table 8 show that the coated abrasive made in accordance with the invention (i.e., including modifying particles in the slurry) performed significantly better in terms of total cut compared with a comparative coated abrasive not having modifying particles in the slurry.

Viscosity and Sedimentation Examples 14–15, Comparative Example W

The following slurry samples were prepared without silane coupling agent to see what effect the addition of modifying particles useful in the invention had on the viscosity of the slurry. The following three batches were prepared having constant volume loading:

Comparative Example W:

700 grams of 40 micrometer avg. part. size WAO, 300 grams resin, 150 grams TATHEIC, 150 grams TMPTA Example 14:

694 grams of 40 micrometer avg. part. size WAO, 10 grams ASP, and 300 grams resin, 150 grams TATHEIC, 150 grams TMPTA Example 15:

694 grams of 40 micrometer avg. part. size WAO, 10.9 grams PSP, and 300 grams resin, 150 grams TATHEIC, 150 grams TMPTA Examples 14 and 15 and Comparative Example W were each mixed for 10 minutes with a high shear mixer after all the mineral had been added. The viscosity of each was measured using a Brookfield Synchro-Lectric Viscometer, model LVT, at 12 rpm, using a number 4 spindle at room temperature. The viscosities were as follows:

| | |
|---|---|
| Comparative Example W | >50,000 cps |
| Example 14 | 30,000–36,000 cps |
| Example 15 | 31,500 cps. |

This data illustrates that both amorphous and precipitated silica particles function as modifying particles in the slurries of the invention.

The slurries of this set of examples were also tested for sedimentation rate at room temperature. The samples were each stored in black glass jars, and a tongue depressor was used to determine the depth of sediment on the bottom of each sample. The degree of separation was also easily noted by sight, as a clear layer of resin formed on top of the samples as time progressed. The following data was observed after 1 hour and after 3 days of storage without stirring of any kind:

| | 1 hour | 3 days |
|---|---|---|
| Comp. Ex. W | thin resin layer | total separation |
| Example 14 | no separation | thin resin layer |
| Example 15 | no separation | no separation |

This data illustrates how effective the modifying particles are at reducing the settling of mineral particles from the slurry. Note that it took over 30 minutes to redisperse the mineral in Comparative Example W with a high shear mixer.

Examples 16–17, and Comparative Examples X, Y, Z, and AA

To determine the effect of modifying particles on the viscosity of slurries containing resins other than TATHEIC, and to illustrate that not all fumed silica particles qualify as modifying particle useful in the invention, the following slurries were prepared:

Comp. Ex. X:

694 grams of 40 micrometer avg. part. size WAO, 300 grams resin, 50 parts TATHEIC, 50 parts TMPTA Comp. Ex. Y:

694 grams of 40 micrometer avg. part. size WAO, 300 grams 50 parts TATHEIC, 50 parts TMPTA, and 10 grams A200 ("Aerosil 200")

Comp. Ex. Z:

233 grams of 40 micrometer avg. part. size WAO, 100 grams of PAPI

Comp. Ex. AA:

300 grams EPON 500 grams of 40 micrometer avg. part. size WAO

Example 16:

217.1 grams of 40 micrometer avg. part. size WAO, 94 grams of PAPI, and 3.1 grams ASP ("OX-50")

Example 17:

495.7 grams of 40 micrometer avg. part. size WAO, 300 grams of EPON, and 7.1 grams ASP ("OX-50").

All of the above slurries were mixed with a high shear mixer for 10 minutes after the final bit of mineral was added. The following viscosities (cps) were observed with a Brookfield Synchro-Lectric Viscometer, model RVF using a T spindle at 2 rpm and room temperature.

| | |
|---|---|
| Comp. Ex. X | 170,000 |
| Comp. Ex. Y | 210,000 |
| Comp. Ex. Z | 395,000 |
| Example 16 | 300,000 |
| Comp. Ex. AA | 175,000 |
| Example 17 | 170,000. |

The data of these examples illustrate that modifying particles useful in the invention are capable of reducing the viscosity of epoxy resins and polymeric isocyanate resins, while the fumed silica KUTTD "Aerosol 200" increased the viscosity of a slurry of TATHEIC and TMPTA.

Various modifications and alterations of this invention will become apparent to those skilled in the art without departing from the scope of this invention, and it should be understood that this invention is not to be unduly limited to the illustrative embodiments set forth herein.

What is claimed is:

1. A coated abrasive of the type having a flexible backing having an abrasive coating thereon, wherein the abrasive coating is derived from a slurry which consists essentially of [from about 20 to about 95 dry weight percent] polymerizable resin, [from about 30 to about 70 dry weight percent] abrasive particles, and [from about 0.01 to about 30 dry weight percent] modifying silica particles [by, based on dry weight of said slurry] *having a surface area less than about 300 $m^2/gm$, and an average particles size less than about 100 millimicrometers, wherein said modifying particles are present in an amount sufficient to reduce viscosity of the slurry.*

2. A coated abrasive in accordance with claim 1 wherein the slurry includes a photoinitiator.

3. A coated abrasive in accordance with claim 1 wherein said polymerizable resin is an addition polymerizable resin.

4. A coated abrasive in accordance with claim 2 wherein said addition polymerizable resin is selected from the group consisting of styrene, divinylbenzene, vinyl toluene, and aminoplast resins having pendant unsaturated carbonyl groups, isocyanurate resins having at least one pendant acrylate group, acrylated urethane resins, epoxy resins, and isocyanate derivatives having at least one pendant acrylate group.

5. A coated abrasive in accordance with claim 4 wherein said isocyanurate resins having at least one pendant acrylate group is the triacrylate of tris(hydroxyethyl) isocyanurate dissolved in trimethylol propane triacrylate.

6. A coated abrasive in accordance with claim 1 wherein said polymerizable resin includes a reactive diluent selected from the group consisting of N-vinylpyrrolidone, hexanediol diacrylate, triethylene glycol diacrylate, and trimethylol propane triacrylate.

7. A coated abrasive in accordance with claim 1 wherein said polymerizable resin, abrasive particles, and modifying particles form a plurality of abrasive composites having at least one shape, said composites being disposed in an array on said flexible backing.

8. A coated abrasive in accordance with claim 7 wherein said at least one shape is a pyramid.

* * * * *